United States Patent [19]

Valentine

[11] Patent Number: 4,794,887
[45] Date of Patent: Jan. 3, 1989

[54] RECIPROCATORY INTERNAL COMBUSTION ENGINES

[75] Inventor: Ronald E. Valentine, Wittersham, England

[73] Assignee: Collins Motor Corporation Limited, Perth, Australia

[21] Appl. No.: 170,631

[22] Filed: Mar. 15, 1988

Related U.S. Application Data

[63] Continuation of Ser. No. 34,257, Apr. 3, 1987, abandoned.

[30] Foreign Application Priority Data

Apr. 4, 1986 [GB] United Kingdom ................ 8608237

[51] Int. Cl.⁴ .............................................. F02B 75/24
[52] U.S. Cl. ............................ 123/56 AC; 123/192 B
[58] Field of Search ........... 123/55 R, 56 AC, 56 BC, 123/197 AB, 197 AC, 192 R, 192 B

[56] References Cited

U.S. PATENT DOCUMENTS

| | | | |
|---|---|---|---|
| 1,042,975 | 10/1912 | Sailer | 123/56 BC |
| 1,878,767 | 9/1932 | Freund | 123/56 AC |
| 2,147,666 | 5/1937 | Park . | |
| 2,312,057 | 10/1941 | Williams . | |
| 2,826,894 | 3/1958 | August | 123/56 BC |
| 3,608,530 | 9/1971 | Wenzel | 123/56 BC |
| 3,859,966 | 1/1975 | Braun | 123/192 B |
| 4,344,742 | 8/1982 | Ferris | 123/197 AC |
| 4,395,977 | 8/1983 | Pahis | 123/197 AC |
| 4,459,945 | 7/1984 | Chatfield . | |

FOREIGN PATENT DOCUMENTS

| | | | |
|---|---|---|---|
| 15896/76 | 4/1976 | Australia . | |
| 36879/78 | 6/1978 | Australia . | |
| 382697 | 2/1908 | France | 123/56 AC |
| 442867 | 4/1912 | France . | |
| 2452589 | 10/1980 | France . | |
| 0124845 | 7/1983 | Japan | 123/192 B |
| 0050247 | 3/1984 | Japan | 123/192 B |
| 6029 | of 1913 | United Kingdom . | |
| 170676 | 10/1921 | United Kingdom . | |
| 414986 | 8/1934 | United Kingdom . | |
| 827445 | 2/1960 | United Kingdom . | |
| 1447779 | 9/1976 | United Kingdom . | |
| 1455134 | 11/1976 | United Kingdom . | |

*Primary Examiner*—Charles J. Myhre
*Assistant Examiner*—David A. Okonsky
*Attorney, Agent, or Firm*—Flynn, Thiel, Boutell & Tanis

[57] ABSTRACT

A three-cylinder four-stroke internal combustion engine has first and third diametrically opposed pistons and a third piston arranged to reciprocate on an axis at right angles to that of the cylinders. A connecting link assembly is connected at its upper end to the second piston and at its lower end is slidably guided in the engine casing and carries a counterweight. The connecting link assembly has a central parallel sided transverse opening in which can slide a drive block rotatably mounted on a crankpin portion of the engine output shaft which has balance weights. The first and third pistons are interconnected by a further connecting link assembly which is connected to the crankpin in a similar manner. The first and third pistons reciprocate in quadrature with the second piston and the counterweight so that the combined effect of the reciprocating masses is one mass concentrated at the axis of the crankpin and thus readily balanced by the crankshaft balance weight.

16 Claims, 6 Drawing Sheets

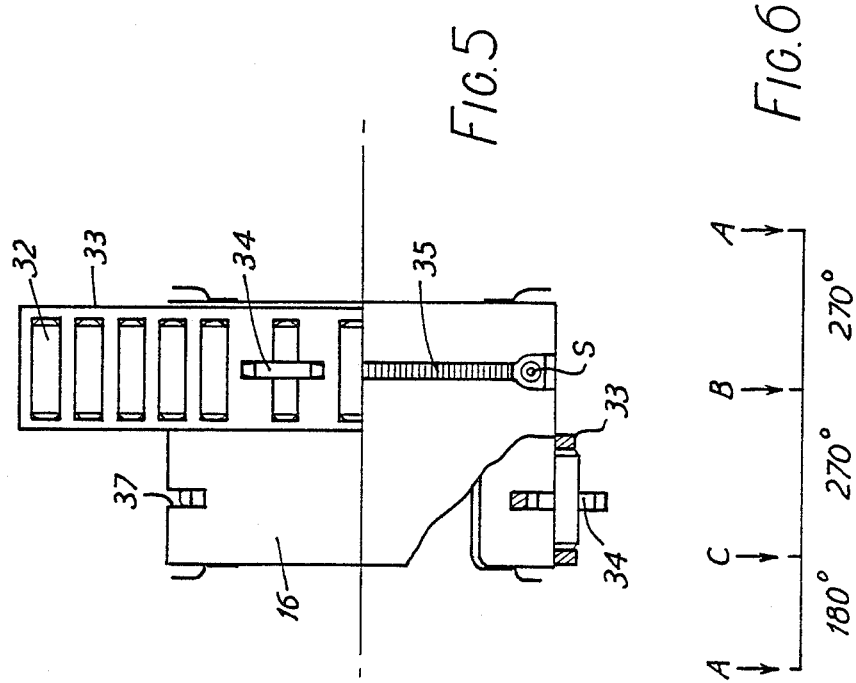

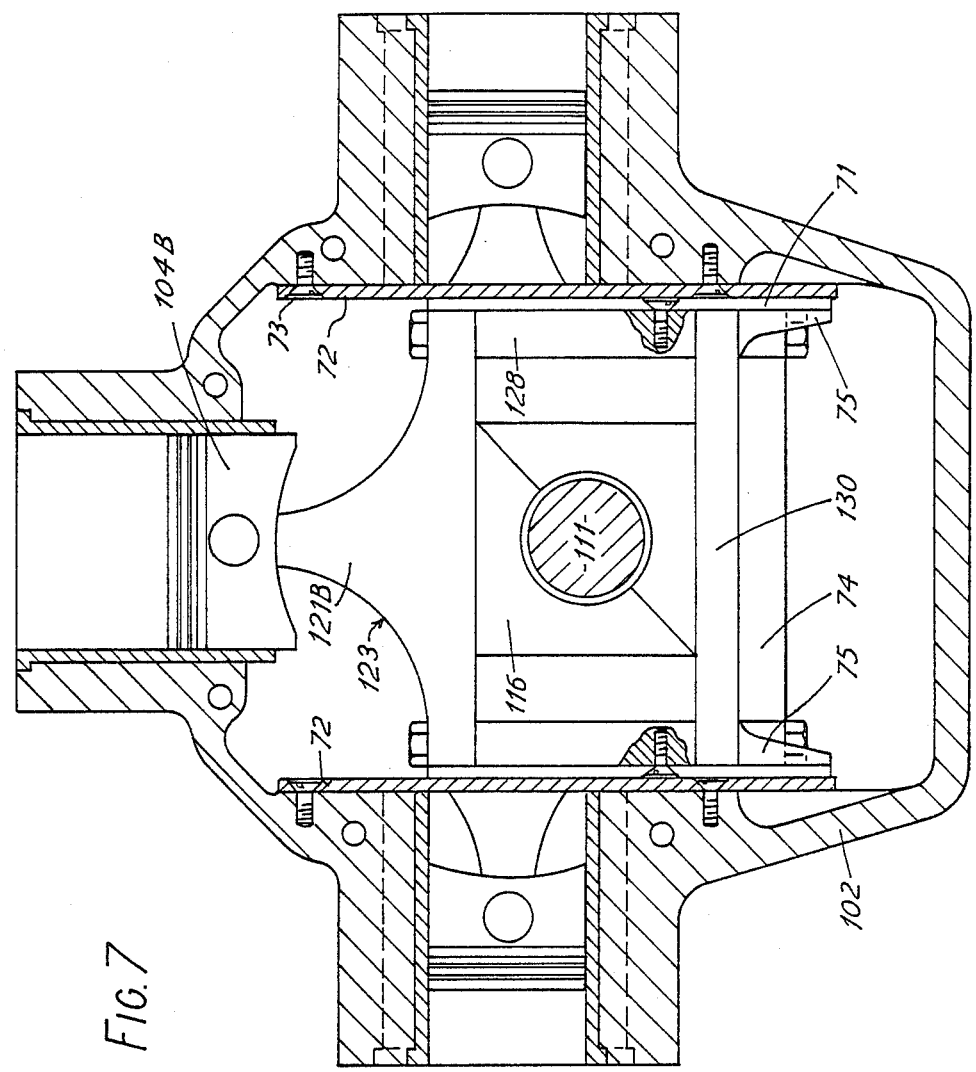

RECIPROCATORY INTERNAL COMBUSTION ENGINES

This application is a continuation of U.S. Ser. No. 034,257, filed Apr. 3, 1987, now abandoned.

BACKGROUND OF THE INVENTION

The present invention relates to reciprocatory internal combustion engines.

According to the present invention there is provided a three-cylinder four-stroke radial internal combustion engine in which two of the cylinders are diameterically opposed and the axis of the third cylinder is at right angles to the axes of the two opposed cylinders.

Also according to the invention, there is provided a four-stroke internal combustion engine having a rotary output shaft and at least one set of three cylinders having a reciprocatory piston in each cylinder, characterised in that the set of three cylinders is associated with one eccentric portion of the output shaft, the first and third cylinders are opposed cylinders on opposite sides of the output shaft and having their axes perpendicular to that of the second cylinder, a reciprocatory counterweight connected to the second piston is guided for reciprocation in the direction of the axis of the second cylinder, drive means interconnect the eccentric portion of the output shaft with the pistons of the three cylinders and with the reciprocatory weight, and rotary counterweight means on the shaft substantially counterbalance the rotating mass effectively formed by the first and third pistons oscillating in quadrature with the second piston and reciprocatory counterweight.

The invention further provides a four-stroke radial internal combustion engine having at least one set of only three cylinders in which two of the cylinders are diametrically opposed and the axis of the third cylinder is at right angles to the axes of the two opposed cylinders, a reciprocatory piston in each cylinder, an output shaft having an eccentric portion, driving means interconnecting the said eccentric portion with the three pistons and forming with the two opposed pistons a first reciprocatory mass and with the third piston a second reciprocatory mass, the directions of reciprocation of the first and second masses being at right angles, the second mass being weighted to be equal to the first mass, the two masses being arranged to be oscillated in quadrature by the eccentric portion and the output shaft having balancing means for counterbalancing the effective rotating mass formed by the two said masses oscillating in quadrature.

BRIEF DESCRIPTION OF THE DRAWINGS

The invention will now be described by way of example with reference to the accompanying drawings, in which:

FIG. 5 is an elevational view of the drive block and two of its linear bearings with portions shown in section, FIG. 6 is a diagram showing the firing order of the engine over two revolutions, and FIG. 7 is a view similar to FIG. 3 of a modified engine.

DETAILED DESCRIPTION

Figure 1:
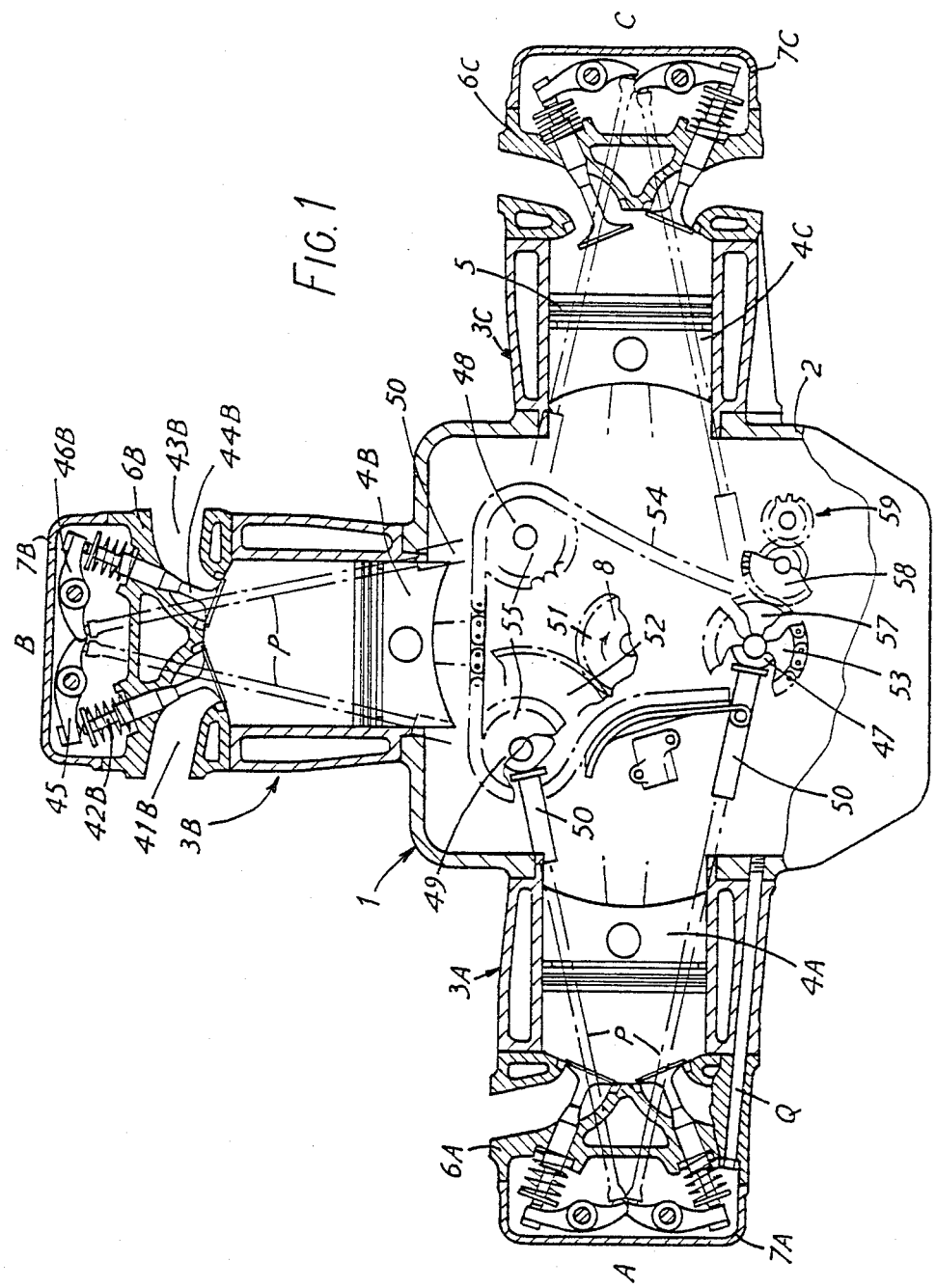
FIG. 1 is a diagrammatic transverse sectional view of an internal combustion engine showing the combustion chambers and their valve gear.

The four stroke internal combustion engine shown in the drawings comprises a crankcase 1 closed at its underside by a sump 2. Three single-cylinder blocks 3A, 3B and 3C are secured to the crank case 1 in alignment with respective openings in the crank walls of the crank case 1 forming three sides of a square. The cylinders A & C are horizontally opposed and co-axial while the cylinder B has its axis vertical and slightly axially offset from the common axis of the cylinders A and C. Each of the cylinders A, B, C carries a respective cylinder head 6A, 6B, 6C carrying a rocker cover 7A, 7B, 7C. Each cylinder block 3 and its head 6 are secured to the crank case 1 by a set of four long studs (one of which is shown at Q in FIG. 1) screwed at one end into the crank case and extending through the cylinder head to carry a nut at the other end.

Slidable in each cylinder 3 is a piston 4 carrying conventional piston rings 5.

Figure 2:
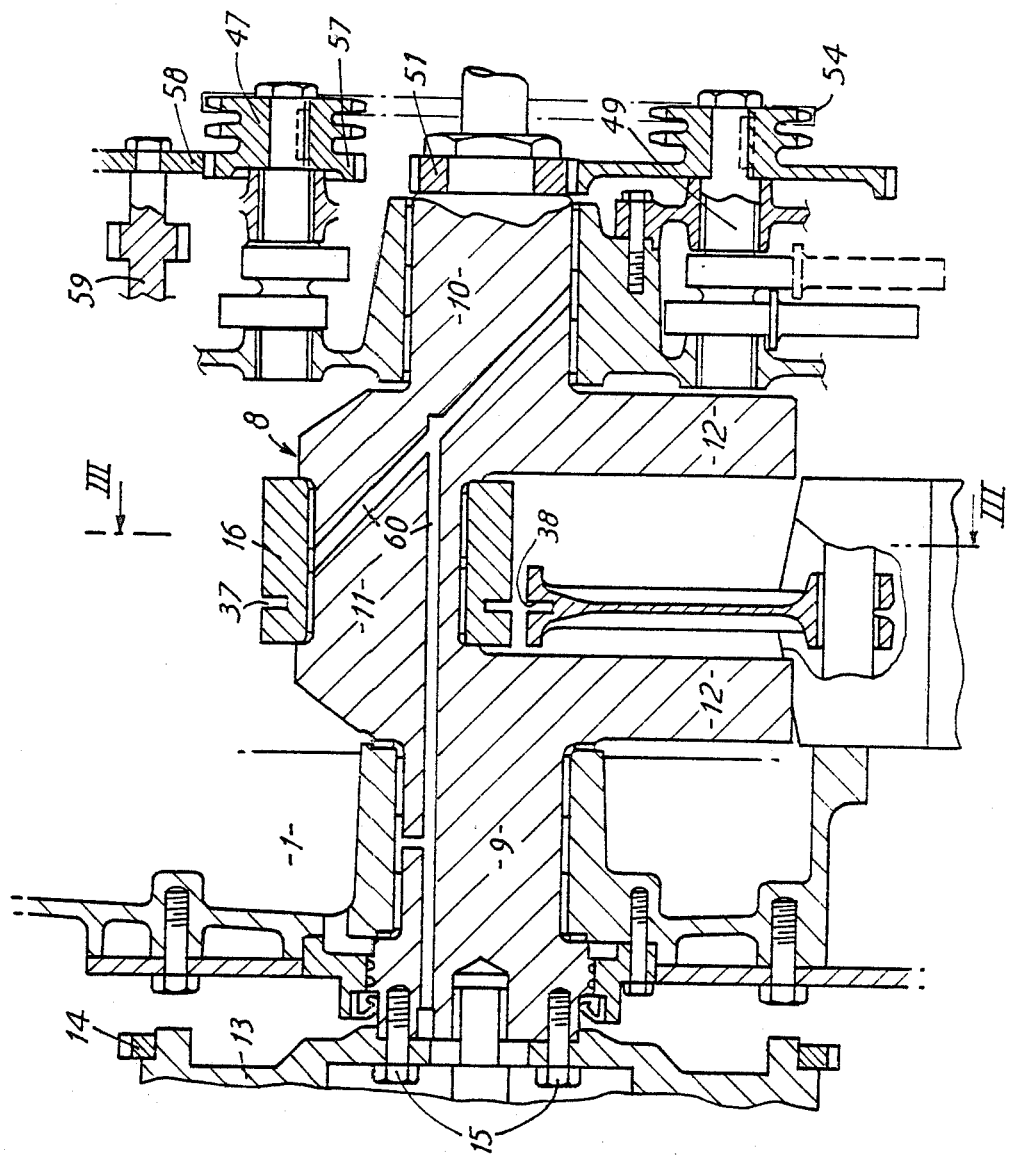
FIG. 2 is a diagrammatic axial sectional view on an enlarged scale through the engine with many portions omitted for clarity.

As can be seen in FIG. 2, a single-throw crankshaft 8 is journalled in the crank case 1 by being formed with journal portions 9 and 10 which are co-axial and supported in main bearing shells (which may be one-piece shells) in the crank case 1. The crankshaft 8 has a single eccentric portion or crank pin 11 connected to the journal portions 9 and 10 by webs which are extended on the opposite side of the crankshaft axis to the crank pin 11 to form counterweights 12. A flywheel 13 carrying a conventional starter ring 14 is secured to the crankshaft journal 9 by bolts 15.

Figure 3:
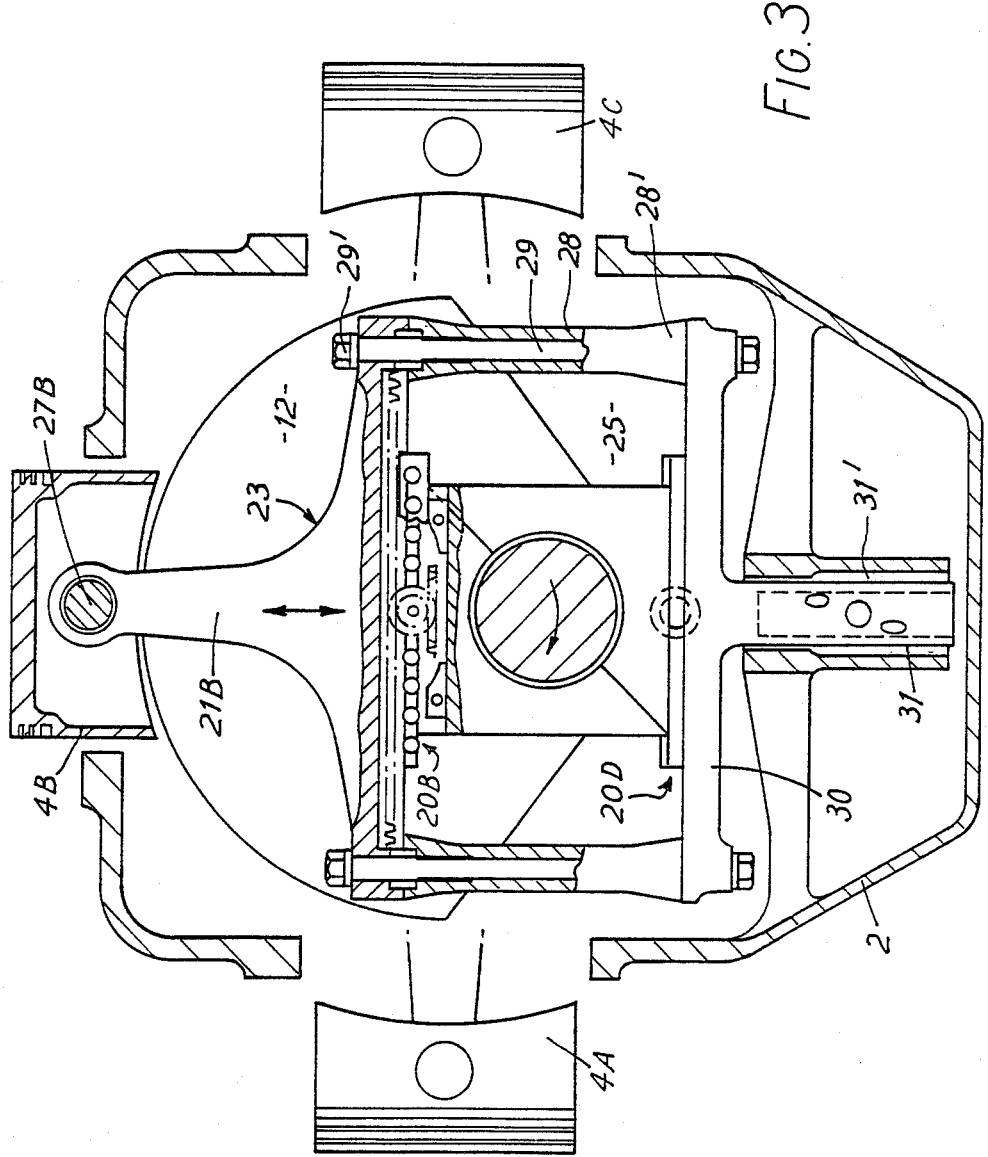
FIG. 3 is a sectional view on the line III—III of FIG. 2.

Rotatably mounted on the crank pin 11 is a drive block 16 which, in radial section and elevation as shown in FIG. 3 is of square outline and is split diagonally into two halves secured together by set screws 17 (FIG. 4) and carries bearing shells 18.

Each peripheral face of the drive block 16 forms (or carries) a flat race of a linear roller bearing 20, the other race of the bearing being formed (or carried) by the base portion of a T-shaped connecting arm 21 of a respective connecting link 22 or 23 which straddles the block and defines a rectangular slot or window 24 to receive the drive block 16.

Figure 4:
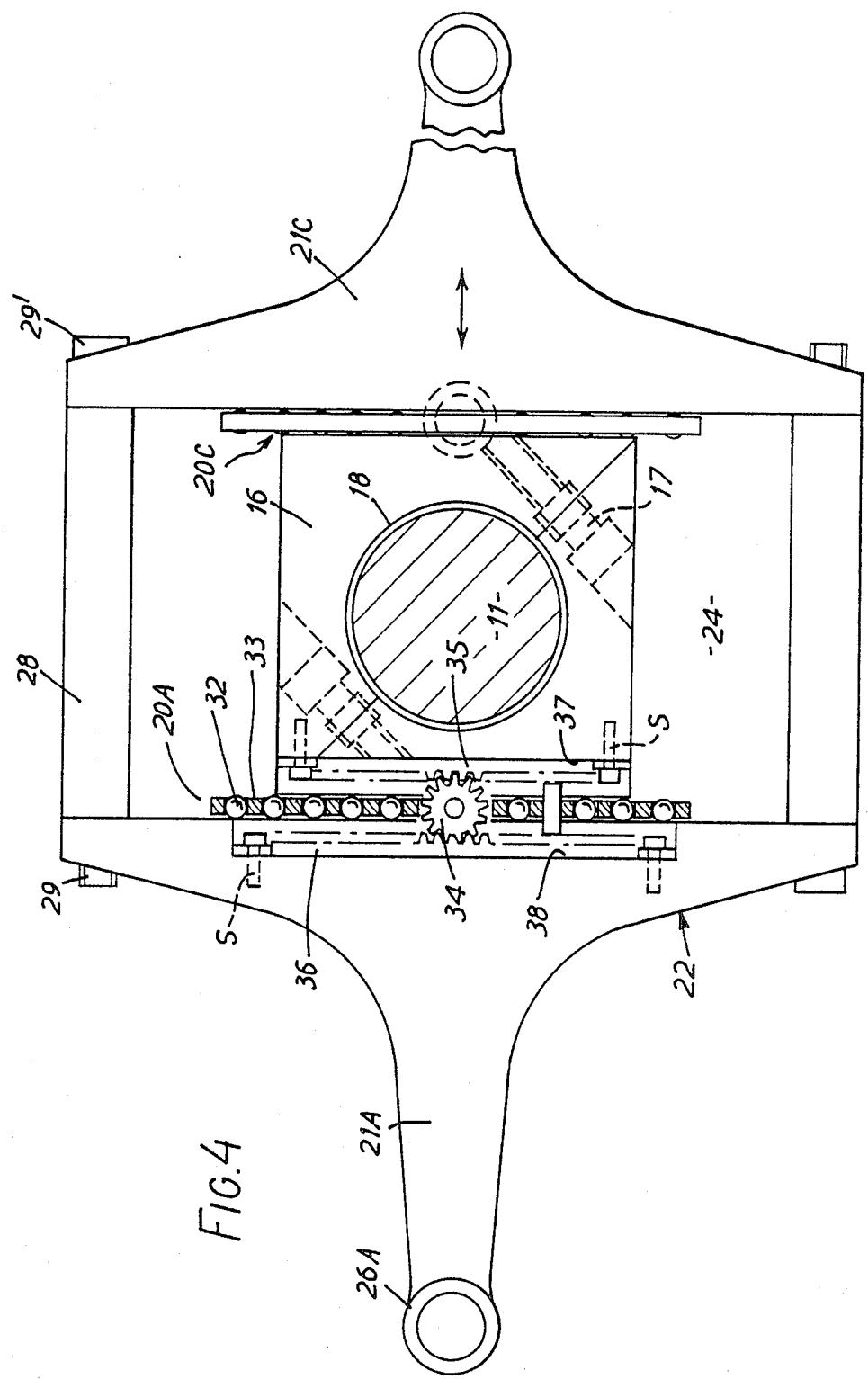
FIG. 4 is an elevational view, partly in section, of the connecting link between the two horizontally opposed pistons.

As shown in FIG. 4, the connecting link 22 comprises two connecting arms 21A and 21C terminating at their free ends in 'little ends' 26 secured to the respective pistons 4 by conventional gudgeon pins. The arms 21A and 21C are spaced by hollow spacers 28 through which extend tie bolts 29 carrying nuts 29' to secure the connecting arms 21 and spacers 28 together to form the connecting link 22.

Similarly, the connecting link 23 (FIG. 3) includes two spacers 28 and tie bolts 29 with their nuts 29'. All of the spacers 28 are preferably of the form shown in FIG. 3, being tubular with enlarged ends 28' to increase the rigidity of the link and maintain the slot or window 25 rectangular.

The link 23, however, has only one connecting arm 21B secured to the piston 4B by way of a gudgeon pin 27B. On the opposite side to the arm 21B, the link 23 is completed by a T-shaped member 30, the upper face of which forms a bearing race for a linear bearing 20D engaging the bottom face of the drive block 16. The member 30 is extended by a stem 31 incorporating a balance weight, the mass and centre of gravity of which is chosen to ensure that the centre of gravity of the assembly formed by the connecting link 23, the piston 4B and the gudgeon pin 27B coincides with the vertical position of the axis of the crank pin 11. The stem 31 is slidably guided in a guide sleeve 31' in a bridge portion of the sump 2. The stem 31 and guide sleeve 31' are preferably located in a dry well in the sump 2 to prevent unnecessary waste of power through oil churning losses.

As can be seen particularly in FIGS. 4 and 5, each linear bearing 20 comprises a set of rollers 32 located in a ladder-type cage 33. In order to prevent displacement of the cage due to slip between the rollers and their races, a pinion 34 is rotatably mounted on the cage 33, conveniently by being located in a slot and being rotatably mounted on one of the rollers 32, and meshes with racks 35 and 36 secured to the bottom walls of grooves 37 and 38 machined respectively in the peripheral faces of the drive block 16 and the connecting arms 21A, B, C and the member 30. The pinion 34 by meshing with both of the racks 35 and 36 always ensures that the cage 33 and the rollers 32 move, relative to the links 22, 23 at half of the speed of the movement of the drive block 16 relative to the links and thus ensure that there is no slip between the rollers 32 and the races. The racks 35 and 36 may be secured by screws S at each end. They and their grooves 37,38 may be T-shaped in cross section with the rack teeth formed on the 'foot' of the T, the wide base of the rack being engaged in the widened base of the groove.

In operation, rotation of the crankshaft imparts a circular motion of the crankpin 11 around the axis of the crankshaft. The vertical component of this motion is transmitted through the drive block 16, to the link 23 and thus to the piston 4B. There is no horizontal constraint between the drive block 16 and the link 23, the drive block 16 being able to move horizontally within the window 25 while still transmitting vertical forces (either upwards or downwards) to the link 23 through the bearings 20B and 20D.

Similarly, the horizontal component of motion of the crank pin 11 is transmitted through the drive block 16 and bearings 20A and 20C while the latter bearings permit the drive block to reciprocate in the vertical direction relative to the link 22 without substantial resistance.

As indicated above in this embodiment, the centre of gravity of the vertically reciprocating mass is made to coincide with the axis vertical location of the crank 11. Similarly, for reasons of symmetry (aided if necessary by normal balancing techniques), the centre of gravity of the horizontally reciprocating masses coincides with the horizontal location of the axis of the crank pin 11. These two reciprocatory motions are in quadrature (i.e. having a phase difference of 90°). The total horizontally reciprocating mass is equal to the total vertically reciprocating mass so that the combined effect of the reciprocating masses is equivalent to a mass concentrated on the axis of the crank pin 11 and thus rotating around the crankshaft axis. The effects of this rotating mass can be readily balanced by appropriate choice of the balance weights 12 (FIG. 2).

As mentioned above in this specific embodiment, the axis of the vertical cylinder B is slightly offset in the direction along the crankshaft axis from the common axis of the cylinders A & C by about half the axial width of the drive block and thus less than the radius of the cylinder bores, in this case being about two thirds of the cylinder bore radius. This offset can, if necessary, be avoided by slighlty canting the connecting arms 21.

As compared with a conventional four-cylinder in-line engine, the construction described above presents several advantages. In addition to the improved balance described above, the axial length of the engine is greatly reduced, and the engine in effect is a radial engine. Internal friction within the engine is also reduced since the roller bearings 20 avoid the transmission of side thrusts onto the pistons. Also, the main bearing area is reduced by avoiding the loads imposed on a conventional crankshaft by the reciprocating pistons and connecting rods. Each cylinder can be formed in a separate single block with a separate single cylinder head, thereby simplifying the tooling up and production processes. Since the crankshaft is a single throw crankshaft, its production is particularly simple and it does not require split main bearing shells.

In the four stroke engine configuration shown particularly in FIGS. 1 and 2, each cylinder head 6 has an inlet passage 41 controlled by a pair of inlet valves 42 and an exhaust passage 43 controlled by a pair of exhaust valves 44. The inlet and exhaust valves are operated by rocker arms 45, 46 which in turn are controlled by three camshafts 47,48,49 through push rods P and cam followers 50.

The crankshaft 8 carries a timing gear 51 which meshes with a larger timing gear 52 on the camshaft 49 and, through the latter drives a sprocket wheel 53 engaged with a timing chain 54 driving the other camshafts 47 and 48 which carry further sprocket wheels 55 engaged with the chain 54. The camshaft 47 carries a further gear 57 meshing with a gear 58 driving a gear-type oil pump 59 to supply pressure lubrication to the main bearings and thus to lubrication passages 60 within the crankshaft leading to the crankpin journal, the drive block and linear bearings 20.

FIG. 6 shows the firing instants of the three cylinders during two revolutions of the crankshaft (720°). As would be expected, the firing intervals are not entirely equal. However, two of these three firing intervals are equal at 270° while the third (A–C) is 180°. Such firing intervals are accordingly sufficiently uniform to be acceptable for most purposes.

Although the engine described above has three cylinders and a single-throw crankshaft, other engines incorporating the invention may have crankshafts with more than one throw, such engines having a set of three cylinders A, B, C for each crankshaft throw.

In FIG. 7, parts corresponding to those of FIGS. 1 to 4 have corresponding reference numerals increased by 100.

In this modified construction, the connecting link assembly 123 is guided at its upper end by the piston 104B as before. In place of the guide rod 31 shown in FIG. 3, the connecting link assembly 123 carries flat elongated guide pads 71, for example of a bearing bronze, which makes sliding contact with elongated linear guides 72 secured to the engine casing for example by means of countersunk screws 73. The guide 72 may be of hardened steel.

The lower element 130 of the connecting link assembly 123 carries the counterweight 74 and also includes two guide horns 75 to provide support area for lower-most extended portions of the guide pads 71 in order to minimise skewing of the connecting link assembly 123. In place of the roller bearings 20, the guide blocks 116 may present plain-bearing surfaces, for example of bronze, to the flat faces of the connecting link 121B and the lower member 130, for example of steel.

I claim:

1. A four-stroke internal combustion engine having a rotary output shaft and at least one set of three cylinders having a reciprocatory piston in each cylinder, characterised in that the set of three cylinders is associated with one eccentric portion of the output shaft, the first and third cylinders are opposed cylinders on opposite sides of the output shaft and have their axes perpendicular to that of the second cylinder, a reciprocatory counterweight opposite the second piston is guided for reciprocation in the direction of the axis of the second cylinder, drive means interconnect the eccentric portion of the output shaft with the pistons of the three cylinders and with the reciprocatory counterweight, and rotary counterweight means on the shaft substantially counterbalance the rotating mass effectively formed by the first and third pistons oscillating in quadrature with the second piston and reciprocatory counterweight.

2. An engine according to claim 1, characterised by first constant-length link means interconnecting the first and third pistons and by second constant-length link means interconnecting the second piston and the reciprocatory counterweight.

3. An engine according to claim 2, characterised in that the centre of mass of an assembly comprising the first link means and the first and third pistons and the centre of mass of an assembly comprising the second link means, the second piston and the reciprocatory counterweight both substantially coincide with the respective locus of movements of the axis of the eccentric portion relative to the respective said assembly.

4. An engine according to claim 2, characterised in that the eccentric portion is of circular cross section and carries a drive block rotatable relative thereto, and each connecting link means includes a transverse guide cooperating with the drive block to permit relative movement between the block and the connecting link means only transversely of the connecting link means.

5. An engine according to claim 4, characterised in that each transverse guide comprises a reciprocatory linear rolling bearing disposed between each of two opposed transverse faces of the drive block and the respective connecting link.

6. An engine according to claim 5, characterised in that the bearing comprises two races, a set of rolling elements interposed between the two races, and a cage for maintaining the rolling elements in their required spacing, characterised in that a toothed rack is associated with each race, the racks face each other and a pinion meshes with both racks and has its axis fixed relative to the cage.

7. An engine according to claim 6, characterised in that the rolling elements are rollers and the pinion is rotatably mounted on one of the rollers.

8. An engine according to claim 1, characterised in that the axes of the three cylinders all intersect the rotation axis of the output shaft.

9. An engine according to claim 1, characterised in that the axes of the first and third cylinders coincide and are displaced from the axis of the second cylinder by a distance less than the cylinder bore diameter and preferably less than the cylinder bore radius.

10. An engine according to claim 1, including inlet and exhaust valve, and three camshafts for the three cylinders, the camshafts being rotationally driven by the output shaft at half the rotational speed thereof.

11. An engine according to claim 10 wherein the inlet and exhaust valves of each individual cylinder are operated by different camshafts.

12. A four-stroke radial internal combustion engine comprising at least one set of only three cylinders in which two of the cylinders are diametrically opposed and the axis of the third cylinder is at right angles to the axes of the two opposed cylinders, a reciprocatory piston in each cylinder, an output shaft having an eccentric portion, driving means interconnecting the said eccentric portion with the three pistons and forming with the two opposed pistons a first reciprocatory mass and with the third piston a second reciprocatory mass, the directions of reciprocation of the first and second masses being at right angles, the second mass being weighted to be equal to the first mass, the two masses being arranged to be oscillated in quadrature by the eccentric portion and the output shaft having balancing means for counterbalancing the effective rotating mass formed by the two said masses oscillating in quadrature.

13. An engine according to claim 12, wherein the driving means each comprise a transverse guide in a constant-length link means secured to the respective piston or pistons, each transverse guide cooperating with a drive block rotatably mounted on the eccentric portion of the output shaft.

14. In a four-stroke internal combustion engine having a rotary output shaft and at least one set of only three cylinders, and a reciprocatory piston in each cylinder, the improvement wherein the set of three cylinders is associated with a single eccentric portion of the output shaft, the first and third cylinders are opposed cylinders disposed on diametrically opposite sides of the output shaft and have their axes aligned with one another and perpendicular to the axis of the second cylinder, the axes of the three cylinders extending perpendicularly with respect to the axis of the output shaft, a reciprocatory counterweight connected to the second piston and guided for reciprocation in the direction of the axis of the second cylinder, drive means interconnecting the eccentric portion of the output shaft with the pistons of the three cylinders and with the reciprocatory counterweight, and rotary counterweight means on the output shaft for substantially counterbalancing the rotating mass effectively formed by the first and third pistons oscillating in quadrature with the second piston and reciprocatory counterweight.

15. An engine according to claim 14, wherein the drive means form with the pistons disposed in the opposed first and third cylinders a first reciprocatory mass, and wherein the drive means form with the piston in the second cylinder and the reciprocatory counterweight a second reciprocatory mass, the second mass being equal to the first mass.

16. An engine according to claim 15, wherein the drive means comprises a transverse guide formed in a constant-length link means and secured to the respective piston for reciprocation therewith, and a drive block rotatably mounted on the eccentric portion of the output shaft and movably cooperating with the respective transverse guide.

* * * * *

UNITED STATES PATENT AND TRADEMARK OFFICE
CERTIFICATE OF CORRECTION

PATENT NO. : 4 794 887
DATED : January 3, 1989
INVENTOR(S) : Ronald E. VALENTINE It is certified that error appears in the above-identified patent and that said Letters Patent is hereby corrected as shown below:

Column 5, line 50; after "link" insert ---means---.

Signed and Sealed this

Twenty-third Day of May, 1989

*Attest:*

DONALD J. QUIGG

*Attesting Officer*        *Commissioner of Patents and Trademarks*